United States Patent [19]

Peot

[11] Patent Number: 5,201,863
[45] Date of Patent: Apr. 13, 1993

[54] MITER TABLE ASSEMBLY FOR A TABLE SAW

[75] Inventor: David G. Peot, Easley, S.C.

[73] Assignee: Ryobi Motor Products Corporation, Easley, S.C.

[21] Appl. No.: 844,462

[22] Filed: Mar. 2, 1992

[51] Int. Cl.⁵ .................................... B27B 25/00
[52] U.S. Cl. ...................... 83/432; 83/435.1; 83/437; 83/477; 83/477.2; 83/581; 83/699
[58] Field of Search ............. 83/435.1, 477.2, 432, 83/437, 581, 477, 699, 700, 468.3

[56] References Cited

U.S. PATENT DOCUMENTS

| | | | |
|---|---|---|---|
| 4,248,115 | 2/1981 | Brodbeck et al. | 83/435.1 |
| 4,441,394 | 4/1984 | Barsotti | 83/435.1 X |
| 4,693,156 | 9/1987 | Olvera | 83/435.1 X |
| 4,934,423 | 6/1990 | Withrow | 83/477.2 X |
| 5,116,249 | 5/1992 | Shiotani et al. | 83/477.2 X |
| 5,123,317 | 6/1992 | Barnes, Jr. et al. | 83/98 |

Primary Examiner—Frank T. Yost
Assistant Examiner—Kenneth E. Peterson
Attorney, Agent, or Firm—Brooks & Kushman

[57] ABSTRACT

An improved miter table (20) for a circular saw table (10) having a rotating blade (12) includes an elongated guide plate (22) having a track (28) mountable to the saw table (10) and the miter table (20) includes an adjustable follower (30) for slidably engaging the track for longitudinal movement along the track (28) that provides transversely adjustable positioning of the miter table (20) with respect to the track (28) thereby to provide precise alignment of the workpiece with respect to the rotatable blade (12) during such movement.

8 Claims, 4 Drawing Sheets

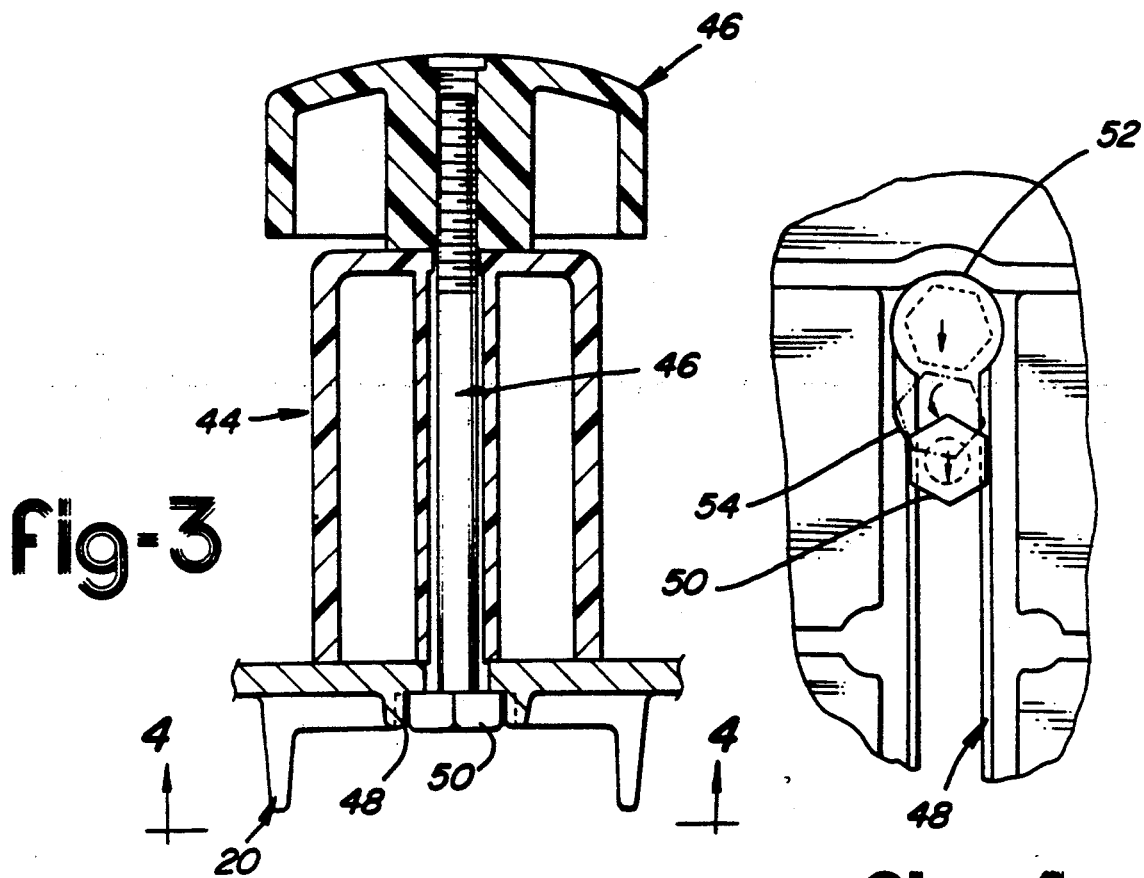
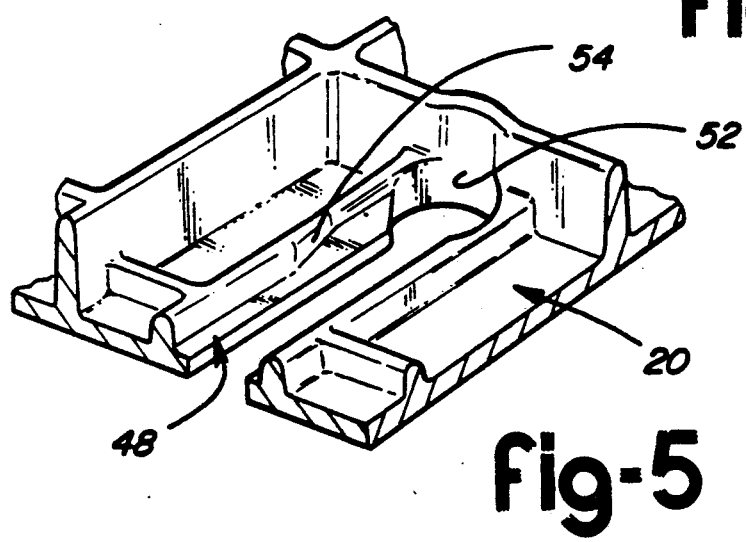

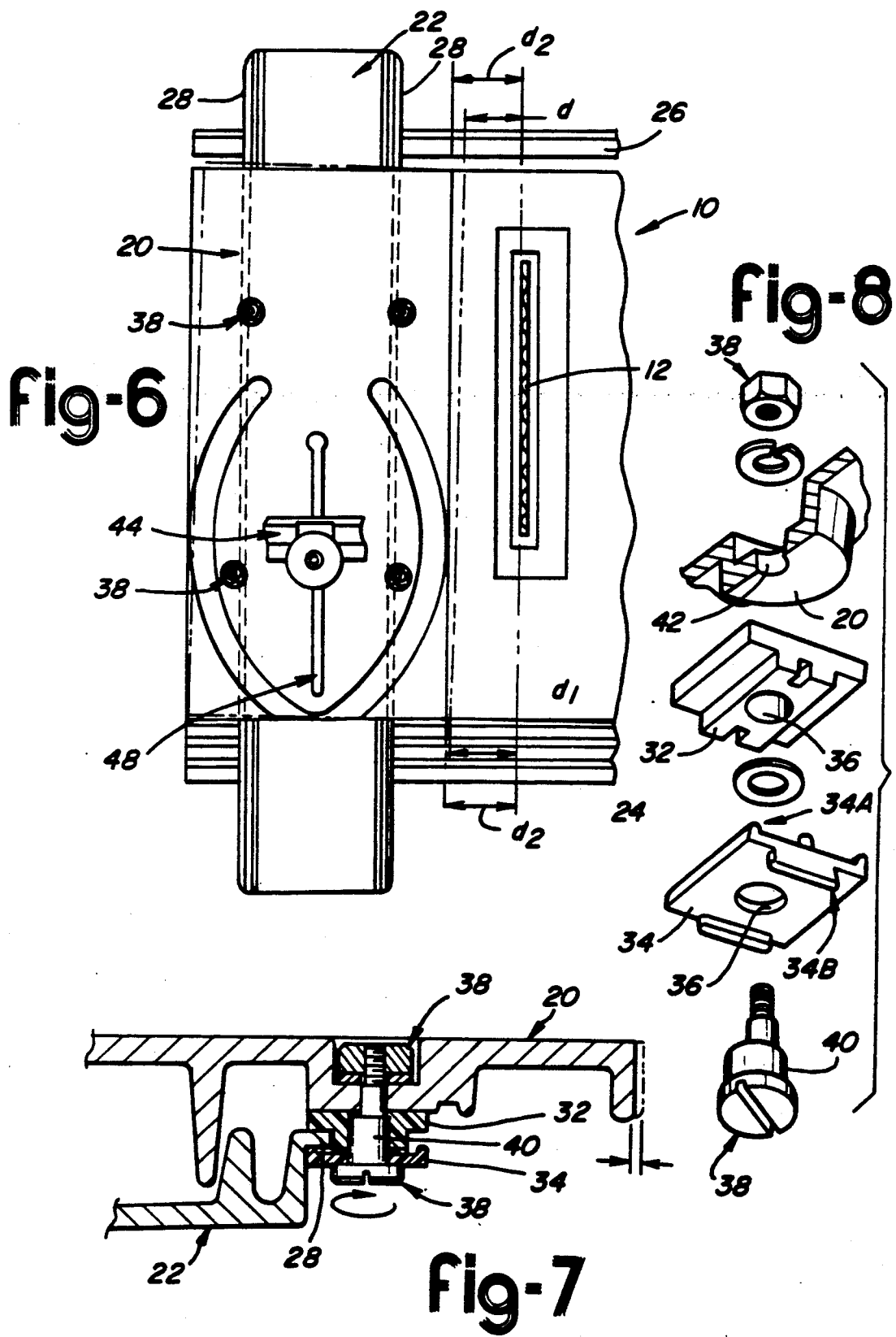

MITER TABLE ASSEMBLY FOR A TABLE SAW

TECHNICAL FIELD

This invention relates to a circular saw table having a rotatable blade for cutting a workpiece, and more particularly to an improved miter table for guiding the workpiece to be cut.

BACKGROUND ART

Circular saw tables such as those disclosed in U.S. patent application Ser. No. 07/672,175, filed Mar. 20, 1991 now U.S. Pat. No. 5,123,317 and assigned to the assignee of the present application, include a miter table which utilizes a ball or roller track slide arrangement. Typically, a guide plate mounted to the saw table has raised edge portions that engage a plurality of balls or rollers disposed about the miter table to allow the miter table to be moved relative to the guide plate, to guide a workpiece to be cut.

As the balls or rollers wear, the precision of the movement of the miter table relative to the guide plate is lessened and there is no way to get that precision back without replacing the balls or rollers. Also, worn balls or rollers tend to stick which inhibits movement of the miter table.

Such a miter table typically includes a miter fence and a polygonal-headed bolt for mounting the miter fence on the miter table. The bolt head is received in a T-shaped slot extending through the miter table and is introduced into the slot through a sufficiently large end. However, the bolt head must be manually rotated while in the large end to align the polygon of the bolt head with the slot so that the bolt head can be received in the slot. This aligning step adds to production assembly time.

DISCLOSURE OF INVENTION

An object of the present invention is to provide an improved miter table in a circular saw table that provides precise alignment of a workpiece.

Another object of the present invention is to provide an improved miter table in a circular saw table that includes an adjustment feature whereby the precise alignment of the miter table can be maintained.

Still another object of the present invention is to provide an improved miter table in a circular saw table that maintains precise linear movement.

A further object of the present invention is to provide an improved miter table in a circular saw table having improved structure for mounting a miter fence on the table.

In carrying out the above objects and other objects of the invention, the improved miter table is used in combination with a circular saw table having a rotatable blade for cutting a workpiece. The miter table is movable with respect to the circular saw table for guiding the workpiece with respect to the rotatable blade. An elongated guide plate is mountable to the saw table and has a track generally parallel to the rotatable blade when the guide plate is mounted to the saw table.

The improved miter table includes a positionably adjustable follower positionably adjustable with respect to the miter table for slidably engaging the track for longitudinal movement along the track of the guide plate. The improved miter table is adjustable transversely relative to the track to position the miter table transversely relative to provide precise alignment of the workpiece with respect to the rotatable blade during such movement.

The adjustable follower includes a rotatable eccentric locator for locating the follower on and with respect to the miter table. The eccentric locator is rotatable to effect positioning of the locator with respect to the miter table and thereby the miter table with respect to the guide plate. Preferably, the guide plate includes two tracks along its edges and the miter table includes a plurality of the adjustable followers mounted therebeneath for slidably engaging the two tracks.

The miter table further includes a miter fence and a polygonal-headed bolt for mounting the miter fence on the miter table. The miter table has a T-shaped slot extending through the miter table for restrainingly slidably receiving the head of the bolt. One end of the slot is sufficiently large to receive the head in the slot when mounting the miter fence on the miter table. The enlarged end includes a ramp angled with respect to the slot for cammingly connecting the enlarged end to the slot. The head is thereby guided into the slot as the bolt is automatically rotated sufficiently to align the polygon of the bolt head with the slot as the bolt is received.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is an enlarged sectional detail view illustrating the mounting of the miter fence on the miter table by a polygonal-headed bolt connected to a T-shaped slot in the miter table;

FIG. 4 is an enlarged sectional detail view taken along lines 4—4 in FIG. 3;

FIG. 5 is an enlarged sectional perspective view of the slot shown in FIG. 4;

FIG. 6 is a plan view of the miter table and guide plate illustrating the alignment feature of the miter table with respect to the guide plate;

FIG. 7 is an enlarged sectional elevational view of a follower and eccentric locator for adjustably mounting the miter table with respect to the guide plate;

FIG. 8 is an enlarged perspective assembly view of the follower and eccentric locator of FIG. 7;

BEST MODE FOR CARRYING OUT THE INVENTION

Figure 1:
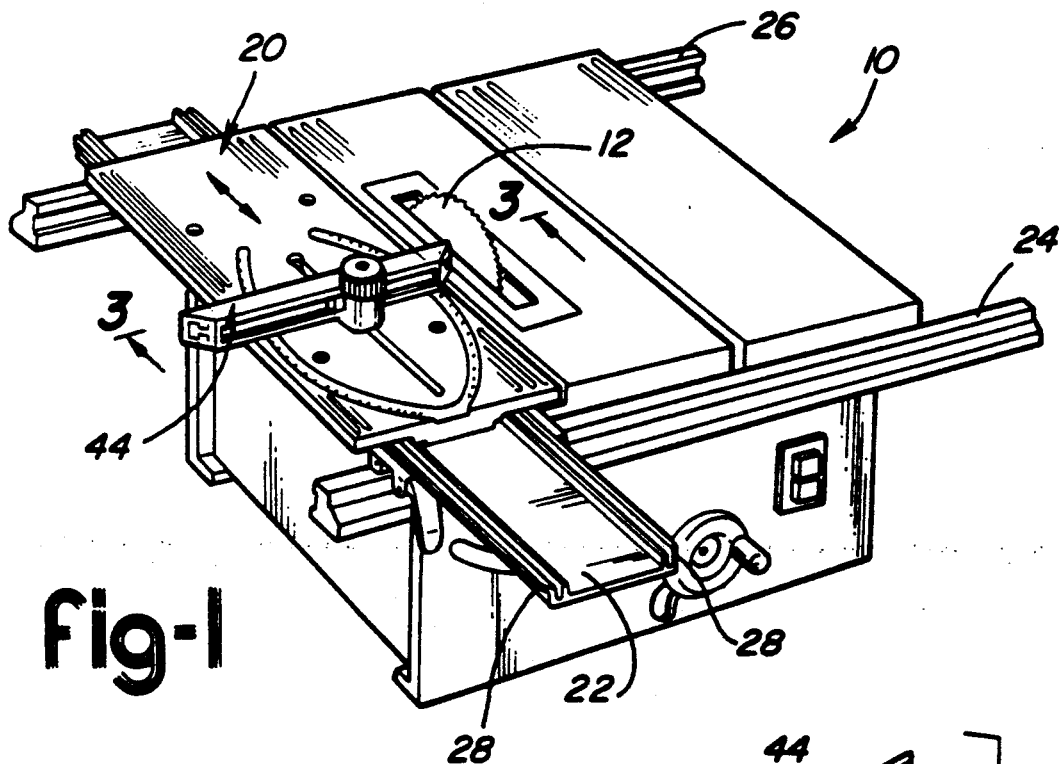
FIG. 1 is a perspective view of a circular saw table having a rotatable blade for cutting a workpiece and a miter table constructed in accordance with the present invention.

Referring to FIG. 1 of the drawings, a circular saw table having a rotatable blade 12 for cutting a workpiece is generally indicated by reference numeral 10 and includes a miter table 20 that is movable with respect to the circular saw table for guiding the workpiece with respect to the rotatable blade. As is hereinafter more fully described, the miter table 20 includes an adjustment feature whereby precise relative alignment of the miter table can be maintained and such structure provides improved movement of the miter table with respect to the saw table 10.

Figure 2:
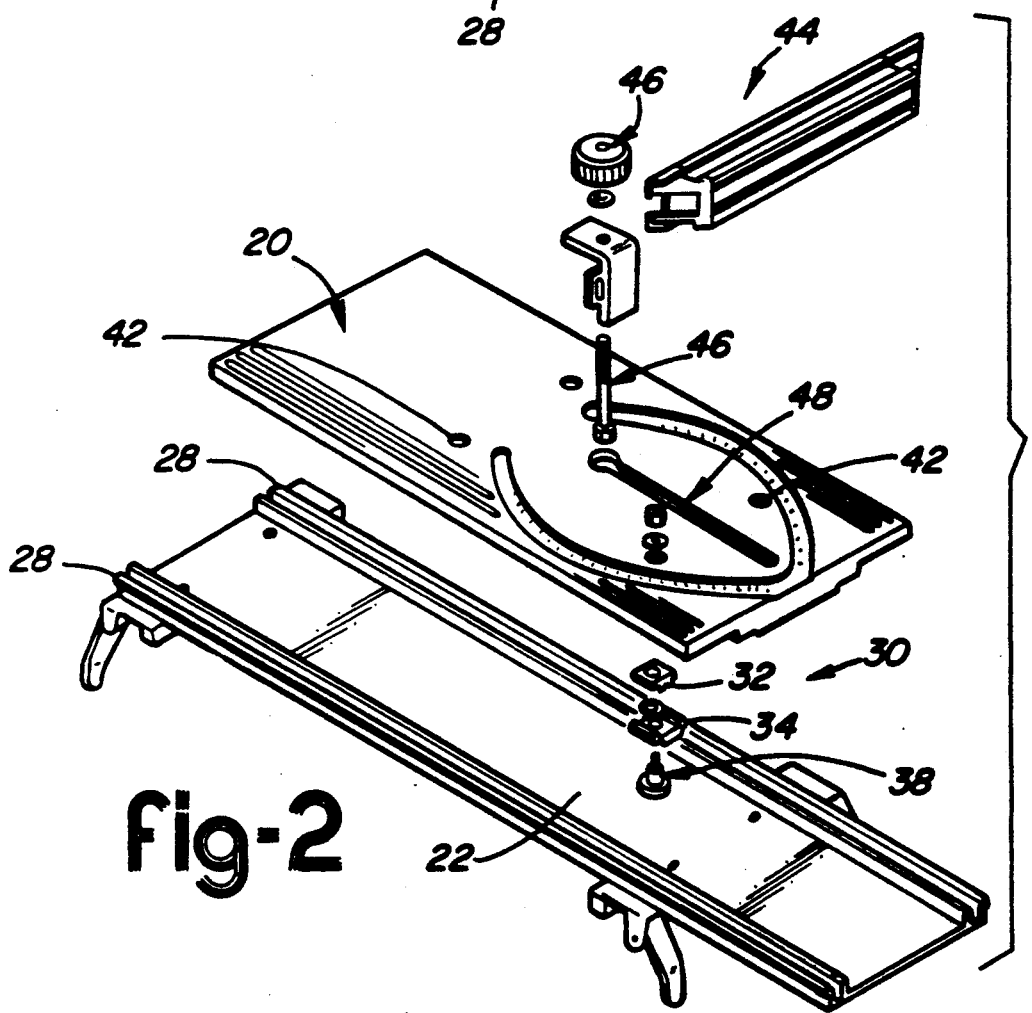
FIG. 2 is a perspective assembly view of the miter table of Figure illustrating a miter fence mounted on the miter table and a guide plate on which the miter table is movably mounted.

Referring to FIGS. 1, 2 and 6, the miter table 20 is supported on an elongated guide plate 22 mountable to and disposed perpendicularly to front and rear guide rails 24,26. The elongated guide plate 22 includes two tracks 28 at its lateral ends, disposed generally parallel to the rotatable blade 12 when the guide plate is mounted on the rails 24,26. The miter table 20 includes two rows of adjustable followers 30 disposed in the longitudinal direction of the miter table 20 that slidably engage the tracks 28 for longitudinal movement along the tracks. The adjustable followers 30 are adjustable transversely to the track 28 to position the miter table 20 transversely to provide precise alignment of the workpiece with respect to the rotatable blade 12 during such movement.

With reference to drawing FIGS. 2, 7 and 8, each follower 30 includes cooperable upper and lower fastening plates 32,34 having a straight edge engaging track 28 and an aperture 36 therethrough. A rotatable eccentric locator 38 is received in the aperture for locating the follower 30 with respect to the miter table 20. The eccentric locator 38 is a bolt assembly having a barrel portion 40. The barrel portion 40 has non-colinear longitudinal axis relative to the axis of the bolt 38 that is received in aperture 36 in the follower 30. The bolt 38 is received in an aperture 42 in the miter table 20 whereby rotation of the barrel portion alters the positioning of the follower 30 and thereby the alignment of the miter table 20 relative to the guide plate 22.

Figure 9:
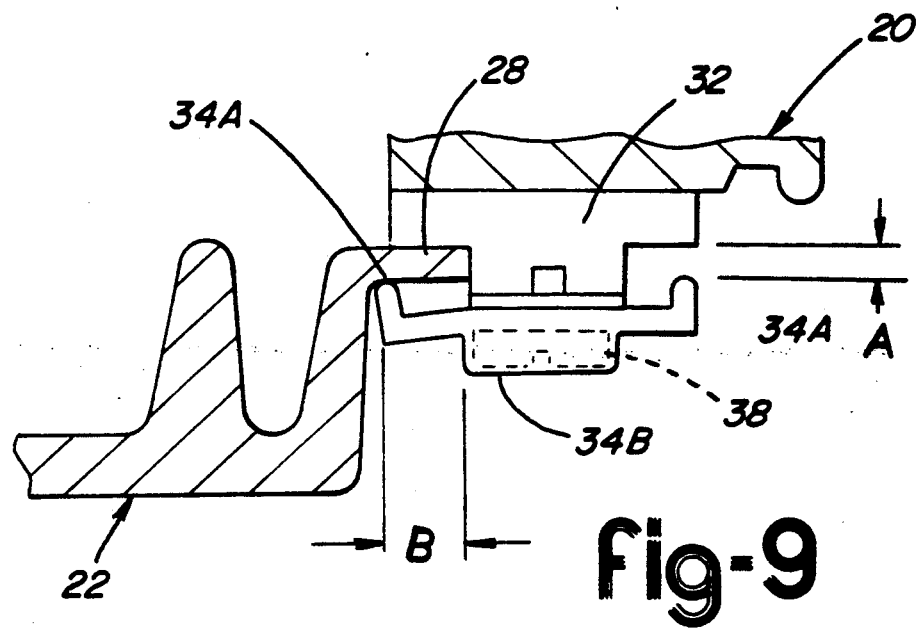
FIG. 9 is an enlarged sectional elevational view of the follower in its assembled condition illustrating cooperable fastening plates that allow the follower to set as a spring.
Figure 10:
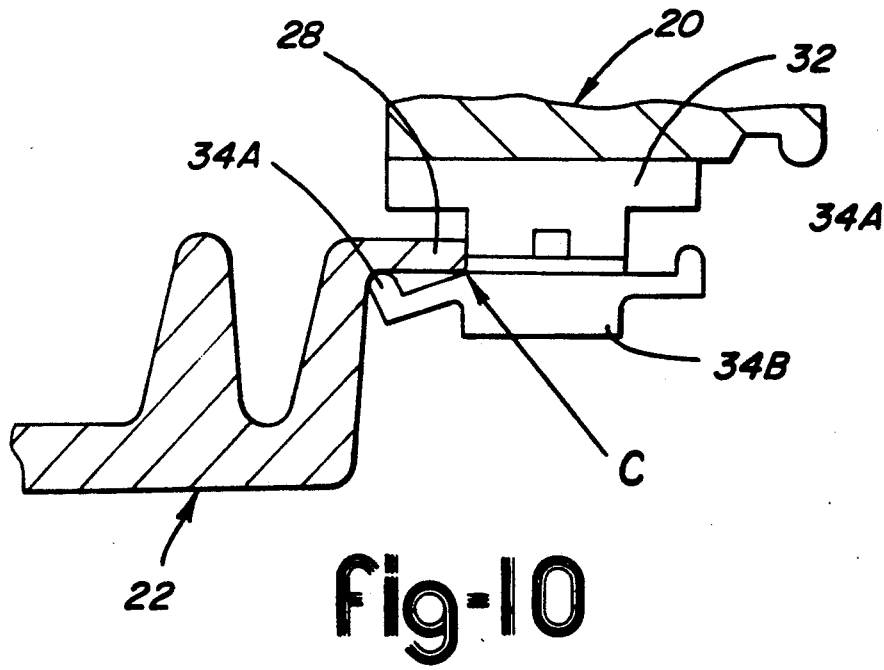
FIG. 10 is an enlarged sectional elevational view of the follower assembly illustrating the fastening plates in an overstressed condition.

FIGS. 9 and 10 illustrate the cooperable relationship between fastening plates 32,34. As illustrated, the space between the peripheral edges of plates 32,34, dimension "A" is slightly less than the thickness of the flange on guide plate 22. When assembled, the portion of lower plate 34, shown as 34B acts as a spring to prevent any play between lower plate 34 and guide plate 22, preventing vertical motion of the sliding table in reference to the miter guide. Small vertical flanges 34A on lower plate 34 insure that the spring works over the length dimension "B". Excessive force applied to the sliding table would normally result in the plastic portion of lower plate 34 acting like a spring being overstressed and causing it to deform. This is prevented by establishing the height of flange 34A so that when it is deflected to a point just short of being overstressed, the flange contact point on guide plate 22 transfers to the point referred to as "C" in FIG. 10 which is directly supported by the second set of vertical flanges 34B.

Referring to FIGS. 2, 3, 4 and 5, the miter table 20 includes a miter fence 44 and a polygonal-headed bolt assembly 46 for mounting the miter fence on the miter table. As illustrated in FIG. 4, the miter table 20 has a T-shaped slot 48 extending through the miter table for restrainingly, slidably receiving the head of the bolt. The slot 48 has one end 52 sufficiently large to receive the head 50 into the slot when mounting the miter fence on the miter table 20. As illustrated in FIG. 5, the enlarged end 52 includes a ramp 54 angled with respect to the slot 48 for cammingly connecting the enlarged end 52 to the slot for receiving the head to guide the head of the bolt into the slot by rotating the bolt sufficiently to align the polygon of the bolt head with the slot as the bolt is received. The camming action created by the movement of the bolt head 50 along ramp 54 allows the bolt to be easily positioned in the slot 48 and eliminates the need to manually rotate bolt 46 until the polygon of the head 50 aligns with slot 48.

While the best mode for carrying out the invention has been described in detail, those familiar with the art to which this invention relates will recognize various alternative designs and embodiments for practicing the invention as defined by the following claims.

What is claimed is:

1. In a circular saw table having a rotatable blade for cutting a workpiece and a miter table movable with respect to said circular saw table for guiding said workpiece with respect to said rotatable blade, the improvement in the miter table comprising:

an elongated guide plate having lateral edges mountable to said saw table; said lateral edges defining two tracks extending generally parallel to the rotatable blade when the guide plate is mounted to said saw table;

said miter table including linearly oriented adjustable follower means for slidably engaging each said track for longitudinal movement therealong; said follower means being adjustable transversely to said track to position said miter table transversely with respect to said guide plate, said follower means including a rotatable eccentric locator for locating said follower means on said miter table; said eccentric locator being rotatable to effect positioning of said miter table with respect to said guide plate thereby to provide precise alignment of the workpiece with respect to the rotatable blade during such movement.

2. In a circular saw table having a rotatable blade for cutting a workpiece and a miter table movable with respect to said circular saw table for guiding said workpiece with respect to said rotatable blade, the improvement in the miter table comprising:

an elongated guide plate mountable to said saw table and having a track generally parallel to the rotatable blade when the guide plate is mounted to said saw table;

said miter table including an adjustable follower means for slidably engaging said track for longitudinal movement therealong and adjustable transversely to said track to position said miter table transversely, said follower means including a rotatable eccentric locator for locating said follower means on said miter table; said eccentric locator being rotatable to effect positioning of said miter table with respect to said guide plate thereby to provide precise alignment of the workpiece with respect to the rotatable blade during such movement.

3. The improvement of claim 2 wherein said miter table further includes a miter fence and a polygonal-headed bolt for mounting said miter fence on said miter table, said miter table having a T-shaped slot extending through said miter table for restrainingly, slidably receiving the head of the bolt and having one end sufficiently large to receive said head into said slot when mounting the miter fence on said miter table; said enlarged end including a ramp angled with respect to said slot for cammingly connecting said enlarged end to the slot receiving the head thereby to guide the head of the bolt into the slot by rotating the bolt sufficiently to align the polygon of the bolt head with the slot as the bolt is received thereby to allow the bolt to be easily positioned in said slot.

4. The improvement of claim 3 wherein said elongated guide plate includes two raised tracks on its lateral edges.

5. The improvement of claim 4 wherein said miter table includes a plurality of adjustable follower means mounted therebeneath for slidably engaging said tracks.

6. The improvement of claim 5 wherein each of said follower means includes an element having a straight edge for abuttingly slidably engaging said track and an aperture therein for receiving said eccentric locator.

7. The improvement of claim 6 wherein each locator is a bolt including a barrel portion having a non-collinear longitudinal axis relative to the bolt, said barrel portion being received therein said aperture in said element and said bolt being received in said miter table whereby rotation of said bolt alters the positioning of the follower and thereby the alignment of said miter table relative to said guide plate.

8. The improvement of claim 7 wherein said T-shaped slot is elongated and extends longitudinally along said miter table.

* * * * *